Sept. 22, 1925. 1,554,305

T. E. SULLIVAN

BEEHIVE APPLIANCE

Filed Jan. 28, 1925

Inventor
T. E. Sullivan
By
Attorney

Patented Sept. 22, 1925.

1,554,305

UNITED STATES PATENT OFFICE.

THOMAS E. SULLIVAN, OF ROSEVILLE, ILLINOIS.

BEEHIVE APPLIANCE.

Application filed January 28, 1925. Serial No. 5,263.

*To all whom it may concern:*

Be it known that I, THOMAS E. SULLIVAN, a citizen of the United States, residing at Roseville, in the county of Warren and State of Illinois, have invented certain new and useful Improvements in a Beehive Appliance, of which the following is a specification.

This invention relates to an appliance for bee hives and has for its principal object to provide a means for controlling the ingress and egress of the bees from the brooder chamber of the hive with respect to the super.

One of the important objects of the present invention is to provide a means for permitting the escape of the bees from the super of a bee hive and preventing the entrance or return of the bees to the super during the removal of the honey from said super.

A further object is to provide a bee hive appliance of the above mentioned character, which may be easily and readily actuated, the device being so arranged in the bee hive as not to interfere with the bees entering or leaving the super when under normal conditions and while the bees are at work, means being associated with the appliance for permitting the bees in the super to leave and preventing the reentry of the same so that the person removing the honey from the super will not be annoyed by the bees.

A still further object is to provide a bee hive appliance of the above mentioned character, which will at all times be positive and efficient in carrying out the purposes for which the same is designated, the same being further simple in construction, inexpensive, strong and durable and further well adapted for the purposes for which it is designed.

Other objects and advantages of this invention will become apparent during the course of the following description.

In the accompanying drawing forming a part of this specification and in which like numerals designate like parts throughout the same:

Figure 1:
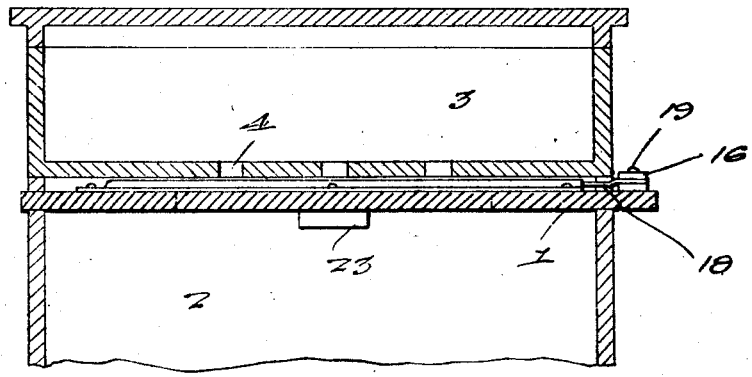
Figure 1 is a longitudinal sectional view through the bee hive showing the manner in which my appliance is arranged therein.
Figure 2:
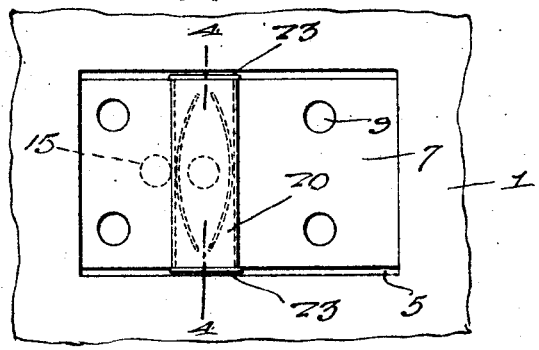
Figure 2 is a fragmentary bottom plan view of the appliance.
Figure 3:
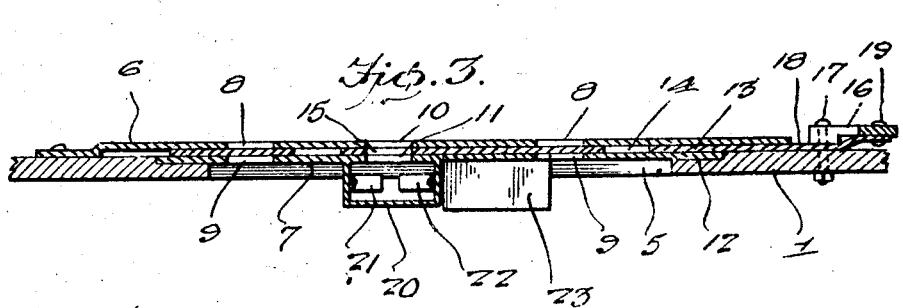
Figure 3 is a longitudinal sectional view through the appliance.

In the drawing wherein for the purpose of illustration is shown the preferred embodiment of my invention, the numeral 1 designates a substantially rectangular shaped base member, the same being adapted to be supported in a horizontal position in the upper portion of the brooder chamber 2 of any conventional type of bee hive, at a point directly below the usual removable super 3, the bottom thereof being provided with the usual opening 4. The base 1 is provided with an enlarged central cut out portion 5 as clearly illustrated in Figures 2 and 3 of the drawing. Disposed over the central cut out portion 5 and secured in spaced relation on the base 1 are the upper and lower plates 6 and 7 respectively.

These plates are provided with registering ingress openings 8 and 9, the same being preferably arranged in the plates at points adjacent the respective corners of the rectangular cut out portion 5. The spaced upper and lower plates are further provided with the central registering egress openings 10 and 11 respectively as clearly illustrated in Figure 3. The purpose of this construction will hereinafter be more fully described.

The lower plate 7 rests on a suitable shoulder 12 provided therefor around the cut out portion 5 so that the upper face of the lower plate will lie substantially flush with the upper face of the base 1. The upper plate 6 is secured on the upper face of the base and is spaced therefrom so as to permit the slidable movement of the gate 13 on the base 1 between the upper and lower spaced plates. The gate 13 is formed preferably of the same material as the upper and lower plates 6 and 7. The gate 13 is provided with a series of ingress openings 14 which are adapted for registry with the ingress openings in the upper and lower plates, the slidable gate being further provided with an egress central opening 15 which cooperates with the registering egress openings provided in the stationary upper and lower plates. The operating means for the slidable gate 13 comprises a transversely extending lever 16 which is pivotally supported at one end as at 17 on the base 1 adjacent the outward extending ends thereof, the slidable gate 13 being provided at one end with an extension 18 which is pivotally secured to the intermediate portion of the lever 16 as at 19.

Figure 4:
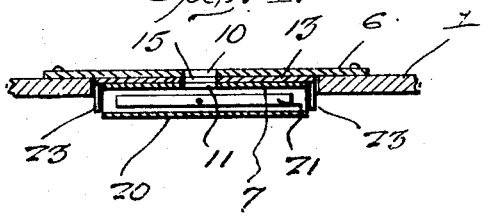
Figure 4 is a sectional view taken approximately on line 4—4 of Figure 2.

A transversely extending escape or exit chamber designated generally by the numeral 20 is associated with the bottom stationary plate 7 and communicates at its top with the egress opening 11 formed in the central portion of the lower plate 7. The respective ends of the escape chamber or casing 20 are open as clearly illustrated in Figure 4. Arranged within the escape or chamber or casing 20 are the cooperating spring elements 21 and 22, the same extending longitudinally within the chamber or casing and being secured at their intermediate portions to the respective sides of the casing, the spring elements gradually converging toward their respective ends to provide the restricted passage whereby bees may leave therethrough on entering the escape chamber, yet preventing the bees from returning through the opening 11 after the same have once passed outwardly of the ends of the cooperating spring elements.

Depending from the intermediate portion of the slidable gate 13 adjacent the side edges thereof are the closure plates or members 23, the same being adapted for cooperation with the respective ends of the escape chamber or casing 20 in the manner to be hereinafter more fully described.

When the slidable gate 13 is moved inwardly between the stationary upper and lower plates, the ingress openings 14 in the gate will be in registry with the registering ingress openings provided in the aforementioned stationary upper and lower plates simultaneously moving the egress opening in the slidable gate out of alignment with the egress opening provided in the central portion of the upper and lower plates. The inwardly sliding movement of the gate 13 furthermore moves the closure members 23 in position over the respective ends of the escape chamber 20 as is clearly illustrated in Figure 2. When the parts are arranged as above described, the bees in the brooder chamber 2 of the bee hive may pass upwardly into the super 3 by entering through the registering ingress openings and the openings 4 provided in the bottom of the super.

When ready to remove the honey from the super, the free end of the lever 16 is moved outwardly causing an outward sliding movement of the gate 13 so that the ingress openings in the slidable gate are moved out of alignment with the registering ingress openings provided in the stationary plates and simultaneously bringing the egress opening 15 of the movable gate into alignment with the central egress registering openings provided in the stationary upper and lower plates. Furthermore, the outward sliding movement of the gate 13 will cause the closure members 23 to be moved out of engagement with the open ends of the escape chamber or casing 20. With the parts arranged as thus described, the bees in the super will pass outwardly therefrom through the registering egress opening in the stationary upper and lower plates and the slidable gate so that the bees will be caused to enter the escape or chamber 20. The bees will leave the escape chamber from either end by passing between the converging free ends of the spring members 21 and 22 whereby the bees will return to the brooder chamber. After all the bees have left the super, the latter may be removed from the hive and the honey taken from the super.

It will thus be seen from the foregoing description that a bee hive appliance has been provided which is of such construction as to enable the same to be readily and easily installed without materially altering the bee hive and will at all times be positive and efficient in carrying out the purposes for which it is designed.

While I have shown the preferred embodiment of my invention, it is to be understood that various changes in the size, shape and arrangement of parts may be resorted to without departing from the spirit of the invention and the scope of the appended claims.

Having thus described the invention, what I claim is:

1. A bee hive appliance comprising a base member supported in the usual brood chamber of a beehive below the perforated bottom of the usual super, said base member being provided with an enlarged cut out portion, upper and lower stationary plates supported on the base over said cut out portion, said plates being provided with registering ingress and egress openings respectively, a gate adapted for slidable movement between said plates, said gate having ingress openings, and an egress opening, the ingress openings in the slidable gate adapted for registry with the ingress openings in the lower and upper plates when the gate is moved in one direction, the egress opening in the slidable gate being simultaneously moved out of registry with the egress openings in the plates, and vice versa, an escape chamber communicating with the egress opening in the lower plate, said escape chamber being open at its respective ends, and means for closing said open ends when the ingress openings are in registry with each other.

2. A bee hive appliance comprising a base member supported in the usual brood chamber of a beehive below the perforated bottom of the usual super, said base member being provided with an enlarged cut out portion, upper and lower stationary plates supported on the base over said cut out portion, said plates being provided with registering ingress and egress openings respectively, a gate adapted for slidable movement between said plates, said gate having ingress openings, and an egress opening, the ingress openings in the slidable gate adapted for registry with the ingress openings in the lower and upper plates when the gate is moved in one direction, the egress opening in the slidable gate being simultaneously moved out of registry with the egress openings in the plates, and vice versa, an escape chamber communicating with the egress opening in the lower plate, said escape chamber being open at its respective ends, and means for closing said open ends when the ingress openings are in registry with each other, said means comprising closure members depending from the side edges of the slidable gate and operable in the cut out portion of the base member.

In testimony whereof I affix my signature.

THOMAS E. SULLIVAN.